Nov. 25, 1958 C. H. BERGSLAND ET AL 2,861,701

REMOTE CONTROLLED HANDLING UNIT

Original Filed Sept. 15, 1954 9 Sheets-Sheet 1

INVENTORS

Robert L. Hedin

Charles H. Bergsland

BY

William C. Stueber ATTORNEY

Nov. 25, 1958 C. H. BERGSLAND ET AL 2,861,701

REMOTE CONTROLLED HANDLING UNIT

Original Filed Sept. 15, 1954 9 Sheets-Sheet 2

INVENTORS
Robert A. Hedin
Charles H. Bergsland

By William C. Stueber ATTORNEY

Nov. 25, 1958 C. H. BERGSLAND ET AL 2,861,701

REMOTE CONTROLLED HANDLING UNIT

Original Filed Sept. 15, 1954 9 Sheets-Sheet 3

INVENTORS
Robert L. Hedin
Charles H. Bergsland
By
William C. Stueber ATTORNEY

Nov. 25, 1958 C. H. BERGSLAND ET AL 2,861,701

REMOTE CONTROLLED HANDLING UNIT

Original Filed Sept. 15, 1954 9 Sheets-Sheet 4

INVENTORS
Robert L. Hedin
Charles H. Bergsland
By
William C. Stuebe
ATTORNEY

Nov. 25, 1958 C. H. BERGSLAND ET AL 2,861,701

REMOTE CONTROLLED HANDLING UNIT

Original Filed Sept. 15, 1954 9 Sheets-Sheet 5

INVENTORS
Robert A. Hedin
Charles H. Bergsland
BY
William C. Stuebe
ATTORNEY

INVENTORS
Robert S. Hedin
Charles H. Bergsland
BY
William C. Stueber
ATTORNEY

Nov. 25, 1958 C. H. BERGSLAND ET AL 2,861,701

REMOTE CONTROLLED HANDLING UNIT

Original Filed Sept. 15, 1954 9 Sheets-Sheet 7

INVENTORS
Robert S. Hedin
Charles H. Bergsland
BY
William C. Stueber
ATTORNEY

Nov. 25, 1958 C. H. BERGSLAND ET AL 2,861,701

REMOTE CONTROLLED HANDLING UNIT

Original Filed Sept. 15, 1954 9 Sheets-Sheet 8

INVENTORS
Robert S. Helin
Charles H. Bergsland

By William C. Stueber ATTORNEY

Nov. 25, 1958 C. H. BERGSLAND ET AL 2,861,701

REMOTE CONTROLLED HANDLING UNIT

Original Filed Sept. 15, 1954 9 Sheets-Sheet 9

INVENTORS
Robert A. Hedin
Charles H. Bergsland

By
William C. Stueber
ATTORNEY

United States Patent Office 2,861,701

Patented Nov. 25, 1958

2,861,701

REMOTE CONTROLLED HANDLING UNIT

Charles H. Bergsland, Stillwater, Minn., and Robert S. Hedin, Pomeroy, Ohio, assignors to General Mills, Inc., a corporation of Delaware Continuation of application Serial No. 456,226, September 15, 1954. This application May 19, 1958, Serial No. 736,285

28 Claims. (Cl. 214—1)

The present invention relates to material handling units and more particularly to units operated by remote control and capable of operations which simulate certain movements of the human body such as the shoulder, upper arm, forearm, wrist and hand. The instant application is a continuation of our application Ser. No. 456,226, filed September 15, 1954, which is now abandoned.

Devices have been proposed in the past for the handling of materials with desired movements transmitted from a control member at one location and the material handling unit in another location. The present invention is concerned with handling units which are capable of performing complex and intricate movements which simulate movements of the shoulder, arms and hands of the human body. An apparatus of this type is disclosed in the co-pending application, Remote Control Handling Unit, Thomas R. James, Serial No. 243,705, filed August 25, 1951, and the present invention is concerned with improvements in devices of this type.

It is an object of the present invention to provide a material handling unit capable of remote control which has increased dexterity and flexibility so that a myriad of operations can be performed by the unit including those which require intricate movements and those which require accuracy and strength.

Another object of the invention is the provision of a material handling unit which carries a gripping hand and for which a plurality of types of hands are provided with the hands being interchangeable solely by means of the remote control for the handling unit.

Another object is to provide a material handling unit having a gripping hand with an improved mechanical operating unit for the grip which has fewer parts and is less complex so that the hand is of lighter weight and has a minimum lost motion in the parts for more accurate operation.

A still further object of the invention is the provision of a material handling unit which may be subjected to overloads without resultant damage to the mechanical parts.

Another object is to provide a material handling unit which simulates operations of the human arm and hand and which can be subjected to improved control for quicker stopping of the motions and greater dexterity in movements.

A further object is the provision of a handling unit which has elements capable of simulating movements of the human arm in which the elements are reduced in size and have less weight to reduce inertia effects and to decrease the size of the operating motors needed to operate the parts of the unit itself.

Other objects and advantages will become more apparent in the following specification and claims taken in connection with the accompanying drawings which describe and illustrate certain preferred embodiments of the invention.

Figure 1:
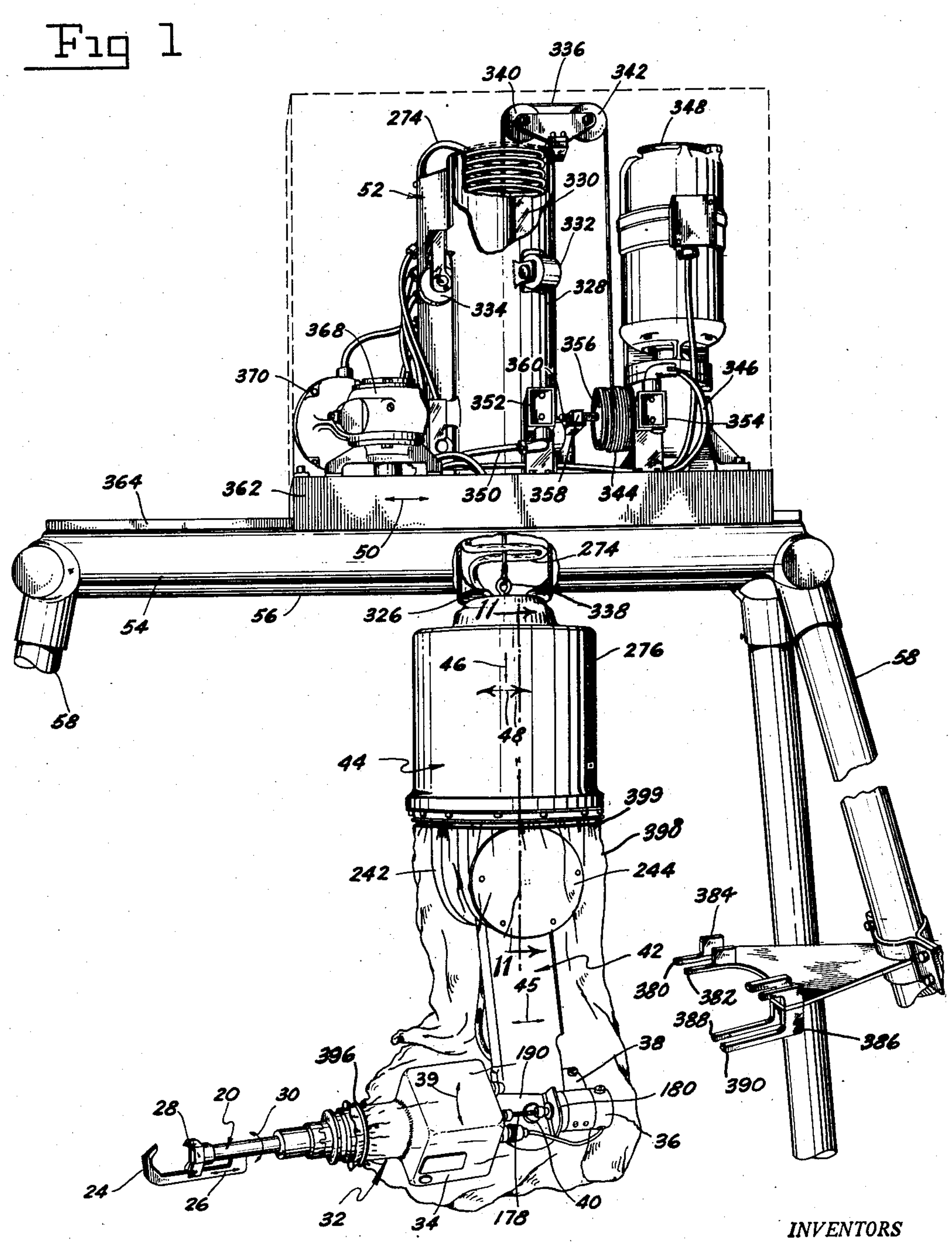
Figure 1 is a perspective view of the material handling unit embodying the features of the present invention.

The handling unit is shown generally in Fig. 1. The unit is driven by electrical motors whose signals are received from a remote control which is not shown or described in the present description but may be of the type shown in the co-pending application, Remote Control Handling Unit, above referred to.

Basically the mechanism illustrating the preferred embodiment of the handling unit is best adapted to operation where precisely controlled movements are required such as in handling and assembling small parts of machinery, carrying containers with liquid contents and other operations which require substantially the same dexterity as is obtained from the human hand. Since the ultimate in dexterity and control can be obtained from the human hand, the operation of movements of the material handling unit is constructed to resemble the human hand and arm.

Figure 2:
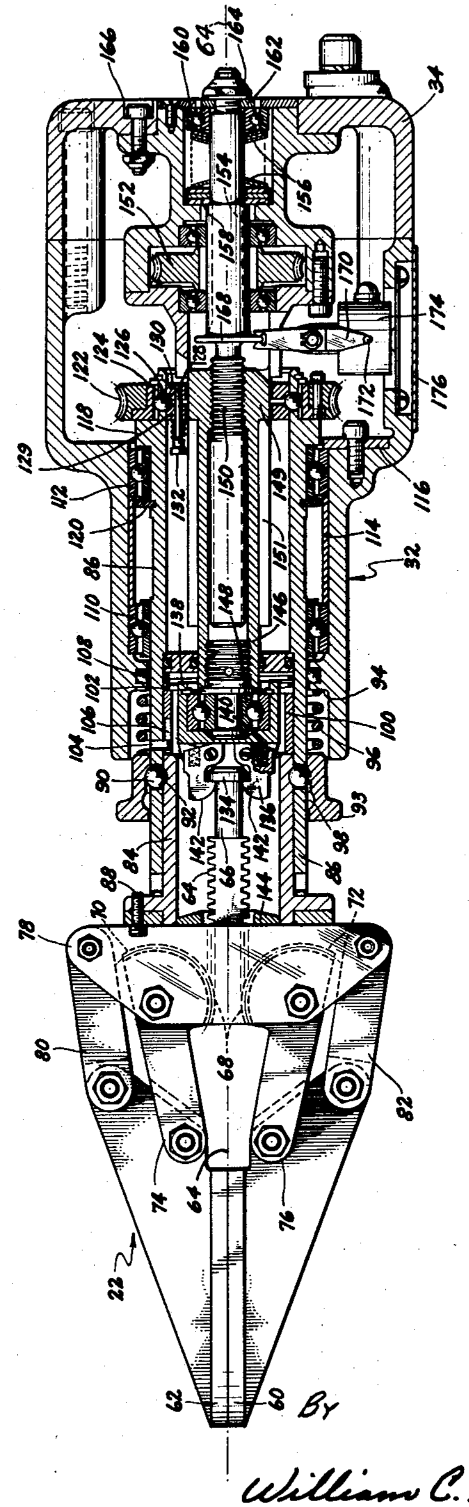
Fig. 2 is a detailed section through the forearm of the handling unit illustrating the mechanism for operating the hand grip.

The hand or grip 20 of the machine may be in the form shown or may take various other forms such as the grip 22 illustrated in Fig. 2. The grip has a jaw 24 which is capable of reciprocating movement as indicated by the arrow 26 toward or away from a mating jaw 28 to grip or release an object which is to be picked up and handled. These jaw portions which handle the object may also be corresponded to fingers and as in the human hand, can be rotated about a wrist. The hand 20 is rotatable as indicated by the arrow 30.

The hand is supported on a forearm 32. This forearm includes a housing 34 which encloses the mechanism for rotating and operating the hand or grip 20. The forearm also carries the electrical motors 36 and 38 which operate the hand and grip.

The forearm is mounted for pivotal movement as indicated by the arrow 39 about a horizontal axis 40 on an upper arm 42.

This upper arm is pivotally suspended from a shoulder portion 44 for movement as indicated by the arrow 45. The shoulder portion has movement in a vertical direction as shown by arrow 46, is rotatable as is illustrated by the arrow 48, and is also movable in a horizontal plane as indicated by the arrow 50. The mechanism for effecting this movement of the shoulder is shown generally at 52.

The unit 52 for operating the shoulder moves in the direction of the horizontal arrow 50 on a pair of tracks 54 and 56 which for purposes of illustration only, are shown as mounted on a supporting stand 58.

From the above it will be apparent that the gripping hand 20 may be carried by the single or combined movements of the series of elements which support it to any position desired within the limits of the size of the mechanism. With the delicate control afforded by the structure of the mechanism shown in the present preferred embodiment, the intricacy of the movement of the hand is limited only by the flexibility of the remote control and skill of the operator.

Since each element of the handling unit, i. e., the grip, the hand, the forearm, the upper arm and the shoulder, is controlled by separate and distinct mechanisms and although they can be operated in unison for a cooperative endeavor, they will be described separately for purposes of clarity.

The mechanism for operating the hand grip is located within the housing 34 which is part of the forearm and which supports the hand and therefore the drawings, Figs. 2–8, will illustrate the hand and the portions of the forearm which support the operating mechanism.

Figure 7:
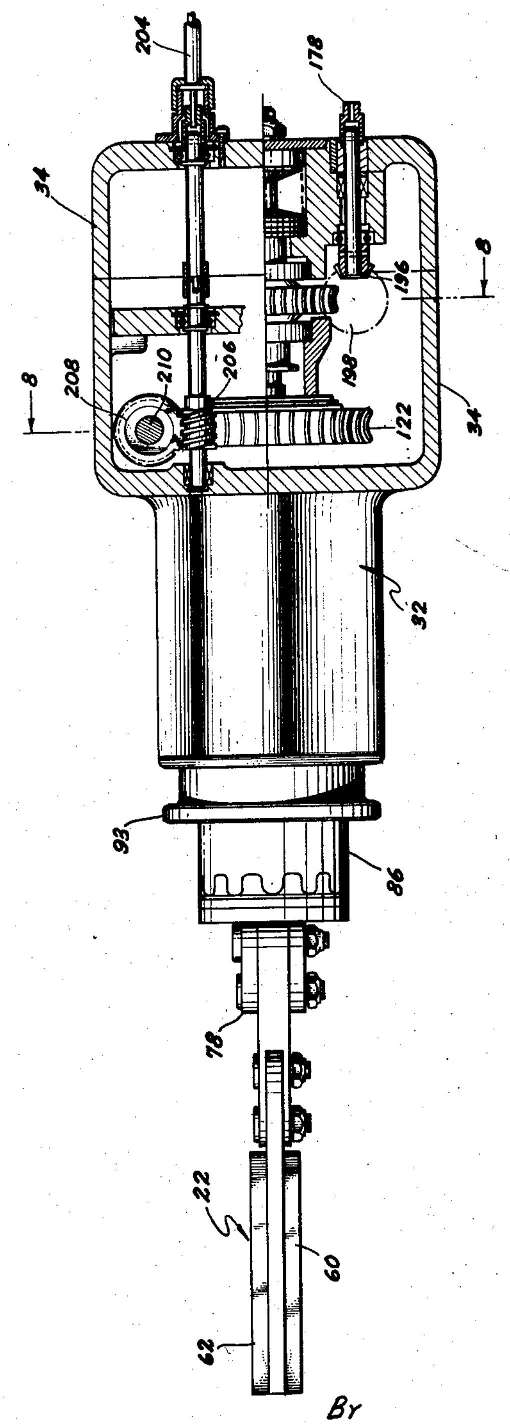
Fig. 7 is a plan view of the forearm and hand with portions in section to illustrate the drive mechanisms for operating the hand grip.

The hand grip 22 which is shown in detail in Figs. 2 and 7 has flat jaws 60 and 62 which move toward or away from each other in a direction lateral to the axis 64 of the forearm and hand. Although the hand 22 is different in structure from the hand 20 of Fig. 1, the apparatus for attaching the hands to the forearm is identical and operation of the grip of the hands is performed in the same manner, i. e., by reciprocation of the member 66 parallel to the axis of the hand.

Member 66 in the hand 22 is illustrated having one end in the form of a rack with teeth 68 on each side of the member to engage the teeth of gear sectors 70 and 72 which are part of pivotally mounted arms 74 and 76 that operate the jaws in their pivotal movement. These arms are pivotally mounted on a jaw support member 78 which also pivotally carries the arms 80 and 82 which help to support the jaws 60 and 62. The arm 80 and the arm 74 combine to form a parallelogram linkage for the jaw to assure that the face of the jaw 62 will approach the opposing jaw 60 with all portions of the jaws remaining the same distance apart, i. e., the jaws remaining parallel.

For supporting the hand on the forearm a hand supporting sleeve 84 telescopes into the rotatable sleeve 86 which extends a distance back into the forearm. The supporting tubular extension is secured to the jaw supporting member 78 of the hand such as by bolts 88.

The sleeve 86 is rotated within the forearm and rotates the hand. To lock the hand to the rotatable sleeve 86 to thereby cause it to rotate with the sleeve and prevent it from dropping from the forearm, the sleeve carries a series of balls 90 in openings and these balls lock in the depression 92 which takes the form of an annular groove in the tubular extension 84 which supports the hand. The balls lock the hand supporting sleeve 84 within the driving sleeve 86 and hold the teeth 392 in the recesses 394, Fig. 5, to drive sleeve 84 in rotation. The locking balls 90 are locked in the groove 92 by a locking ring 93. The locking ring is held in locking position by a coil spring 96 which surrounds the rotatable sleeve and is based against an annular projecting ridge 94 within the forearm casing 32. Since the forearm remains stationary and the sleeve rotates within the forearm, there will be sliding engagement between the spring 96 and the locking ring 93.

The locking ring when in locking position, as shown in Fig. 2, cams the balls 90 into the groove 92 but also has an enlarged annular groove 98 into which the balls drop when the locking ring is slid toward the forearm for purposes of removing the hand. This operation is more fully described in connection with Figures 3–6 which are shown to illustrate changing hands on the arms by merely using the remote control for the unit.

A ball-retaining sleeve 100 is also mounted within the rotatable sleeve and butts against the tubular extension 84 from the hand when the hand is locked to the rotatable sleeve. The ball-retaining sleeve 100 is urged outwardly toward the hand by a coil spring 102 and when the hand is removed the ball-retaining sleeve slides outwardly to help urge the hand away from the forearm. Its prime function is to move in front of the balls 90 to prevent them from dropping out inside of the rotating sleeve. A pin 104 projects inwardly from the rotatable sleeve into a slot 106 in the ball-retaining sleeve 100 to prevent the sleeve from being carried too far by the action of the spring 102.

The annular ridge 94 within the forearm 32 carries an O ring 108 for a dust seal to prevent foreign matter from entering into the housing 34 of the forearm.

The rotatable sleeve 86 is supported within the forearm 32 by a pair of bearings 110 and 112. The rear bearing 112 is locked in position within the forearm housing to prevent longitudinal displacement parallel to the forearm axis. The bearing 112 is also locked to the rotatable sleeve 86 so that the sleeve will not be forced into or out of the forearm housing when axial forces are applied to the hand.

For locking the bearing to the housing a spacer ring 114 butts against the forward bearing 110 and a stop washer 116 is bolted within the casing to lock the bearing against the spacer ring. The bearing butts up against a shoulder 118 on the sleeve and against an annular bearing locking ring 120 which is seated in the sleeve.

To rotate the hand and the sleeve 86 on which it is carried, a drive gear 122 is carried on its inner end. The drive gear is driven by mechanism which will be described in connection with Figs. 7 and 8 and drives through a slip clutch so that resistance to the rotation of the hand in excess of a predetermined amount will cause the clutch to slip preventing damage to the drive mechanism.

The slip clutch includes pockets 124 on the inner annular face of the gear 122 in which are seated balls 126. These balls are carried in small openings 128 in the sleeve and are squeezed outwardly into the pockets by the plates 129 and 130 which are resiliently urged together by spring loaded pins 132. Thus as an overload is encountered by the rotating hand the balls 126 will be forced out of the pockets 124 to press the spring loaded plates 129 and 130 away from each other to cause the clutch to slip.

The jaws of the hand are operated independently of the rotation of the hand and for this purpose the member 66 is reciprocated. To connect the member 66 to the operating mechanism the member is provided with a flanged end 134 which is gripped by a pair of tangs 136. The tangs which are in the form of hooks to grip the flanged end are pivotally mounted on a tang supporting member 138 and springs 140 push on the base of the tangs to pivot them in a direction to cause them to grip the flanged end 134. The tangs have curved outer surfaces 142 which engage an annular collar 144 having a cam face to automatically unlock the tangs from the flange 134 when the hand is to be removed from the forearm and this will be described in detail in connection with Figs. 3–6.

When the hand is rotated the reciprocating member 66 and the tangs and supporting member 138 rotate therewith. A driving member 146, however, remains stationary during rotation and to permit this, driving member 146 and tang supporting member 138 are rotatably connected by a bearing 148. The driving member 146 is in reality an elongated nut which is prevented from rotating by ridges 149 projecting into keyways 151 within the forearm housing.

A screw 150 extends into the elongated nut 146 and rotation of the screw 150 will reciprocate the nut 146, thus driving the member 66 in reciprocation through the gripping tangs 136. Reciprocation of the rack member 66 will of course operate the jaws.

If the hand 20, shown in Fig. 1, is used the member 66 is replaced by a similar member which is attached to the jaw 24 of that hand.

A gear 152 is keyed to the screw 150 to rotate it in either direction and cause reciprocation of the nut 146. The key 154 which locks the gear 152 to the screw 150 is elongated to permit the screw 150 to slide within the gear 152 and as resistance to the closing of the jaws is encountered axial deflection of the screw and associated elements is caused. The screw 150 is normally held in place by a set of spring washers 156 which is based against a shoulder 158 of a casting which is part of the forearm housing 34.

The other end of the stack of spring washers abuts the inner race of a bearing 160 which is prevented from sliding off of the end of the screw 150 by a washer 162 held in place by a nut 164. The washer 162 and inner race of the bearing 160 are movable with respect to the end wall 166 of the housing 34 and therefore these elements can move to the left as shown in Fig. 2 to compress the stack of spring washers 156. The spring washers are of a well known type which may be designed to deflect in proportion to the resistance encountered by the gripping jaws. Therefore to measure the resistance encountered by the gripping jaws the deflection of the screw 150 is measured.

To measure this deflection this screw is provided with an annular ridge 168 which is straddled by the fingers of the pivotal arm 170. This arm is pivotally mounted within the housing 34 and at its lower end carries an electrical contact brush 172 engaging a variable resistance coil 174. The position of the brush 172 on the coil 174 determines the amount of current flowing in the circuit connected to the coil 174. Electrical leads, not shown, which are connected to the brush 172 and coil 174 lead to a force indicating meter in the control panel to indicate to the operator the amount of resistance to the movement of the jaws which is of course, the gripping force of the jaws. A removable plate 176 covers an opening in the side of the housing 34 through which the coil 174 may be installed and serviced.

With reference to the above description, it will be noted that the rotation of the gripping hand is caused by driving the gear 122 and operation of the gripping jaws is caused by rotation of the gear 152. These gears are driven by electrical motors which are supported on the forearm outside of the housing 34.

With reference to Fig. 1, the motor 36 drives a shaft 178 which leads through the wall of the housing 34 to drive the gear 152 through a gear train. The motor 36 is carried on a flange 180 which projects outwardly from one of the arms 190 which straddles the upper arm 42. The arm 190 is pivotally connected to the upper arm to pivot about the axis 40. The motor supporting flange 180 is positioned so that the motor will be supported relative to the pivotal axis 40, on the side of the axis opposite the forearm 32, thus helping to counterbalance the weight of the forearm 32.

Figure 9:
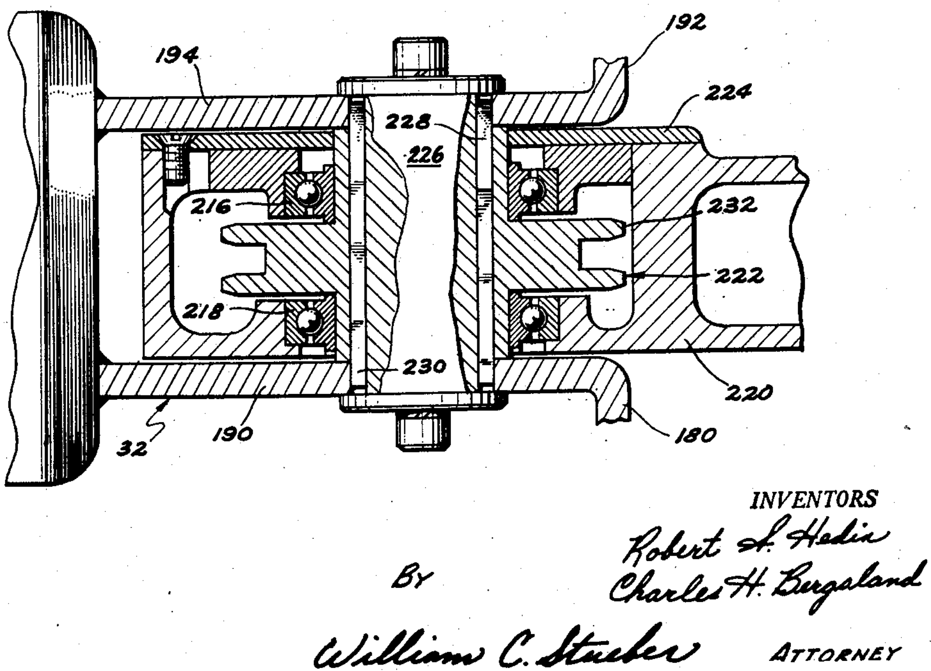
Fig. 9 is a sectional view taken along line 9—9 of Fig. 10.

A similar motor 38 is also mounted on a flange 192, shown in Fig. 9, which projects from the arm 194 straddling the upper arm 42. This flange 192 is so positioned that the motor 38 will be on the opposite side of the pivotal axis 40 so that it too will help to counterbalance the weight of the forearm 32. With the weight of the forearm counterbalanced the amount of power required to pivot the forearm is clearly reduced, thus decreasing the power requirements and increasing the accuracy of control with which the forearm and hand can be moved.

Each of the motors 36 and 38 is preferably a D. C. constant torque motor with an automatic brake so that movements of the operating element will cease immediately after the electrical current is terminated at the control panel. This feature is accomplished preferably by using a dynamic brake motor or in some instances a magnetic brake can be used. The motors for operating the forearm, upper arm and shoulder are also provided with this automatic brake feature.

Figure 8:
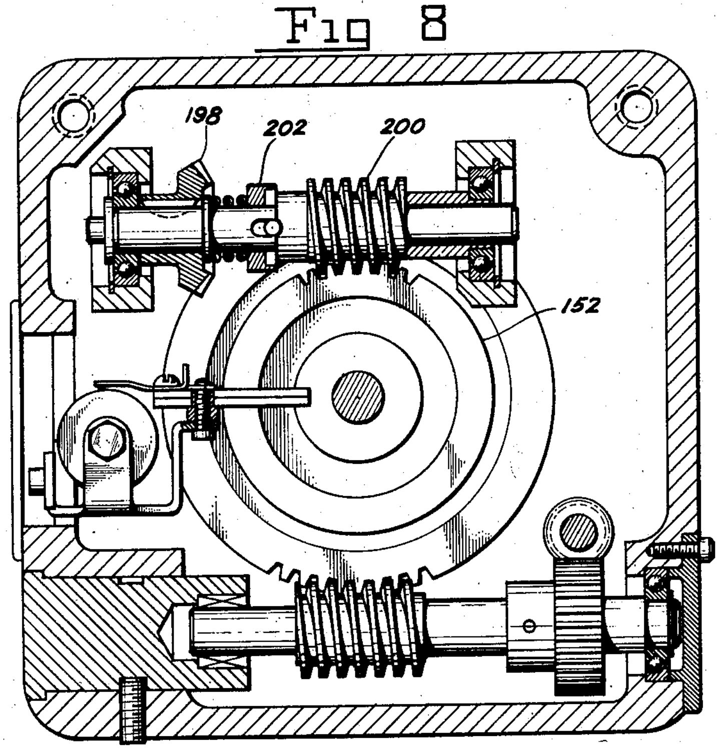
Fig. 8 is a sectional view taken along line 8—8 of Fig. 7.

In Figs. 7 and 8 the gear train for driving jaw operating gear 152 and hand rotating gear 122 from motors 36 and 38 is shown. Motor 36 drives shaft 178 which leads through the wall of the housing 34 of the forearm. The inner end of shaft 178 carries a beveled pinion gear 196 driving beveled gear 198. In Fig. 8 gear 198 drives worm gear pinion 200 through a slip clutch 202 which is of a design known to the mechanical art and need not be described in detail. This gear train which moves the hand grip will cease to drive when too much resistance is encountered to the gripping action because the clutch 202 will begin to slip. To continue the drive, the pinion 200 drives the worm 152 which is shown in Fig. 2.

In the drive for rotating the hand grip, the motor 38 drives a shaft 204, Fig. 7, which leads through the wall of the gear housing 34. This shaft drives the pinion 206 which drives worm gear 208. The worm gear 208 is mounted on shaft 210 and carries another worm not shown which drives the hand rotating worm gear 122.

Figures 1 and 2 illustrate two types of gripping hands 20 and 22. These and other hands may be provided for the material handling unit for performing different specific operations and with the mechanism of the present invention it is possible to change types of hands with the remote control for the operating unit without personal manual attention to the handling unit. This is an advantage where the hand is operating in atmospheres where it would be inconvenient to have personnel enter the area or where the remote control is a considerable distance from the operating unit and change must be frequently made.

Figures 3, 4:
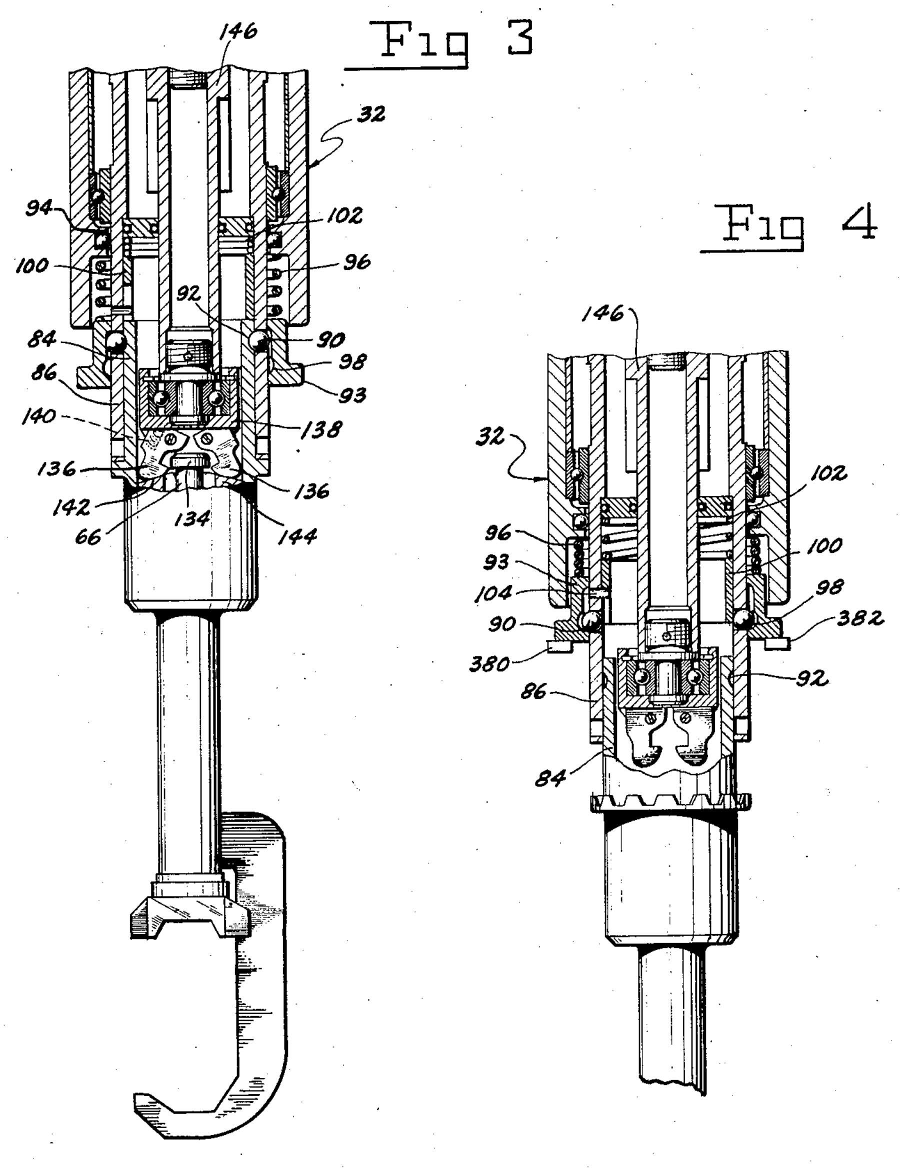
Fig. 3 is a sectional view taken through a portion of the forearm and illustrating a step in remotely disconnecting the grip from the forearm.
Fig. 4 is a sectional view taken through a portion of the forearm illustrating the second step required in removing the grip from the arm.
Figures 5, 6:
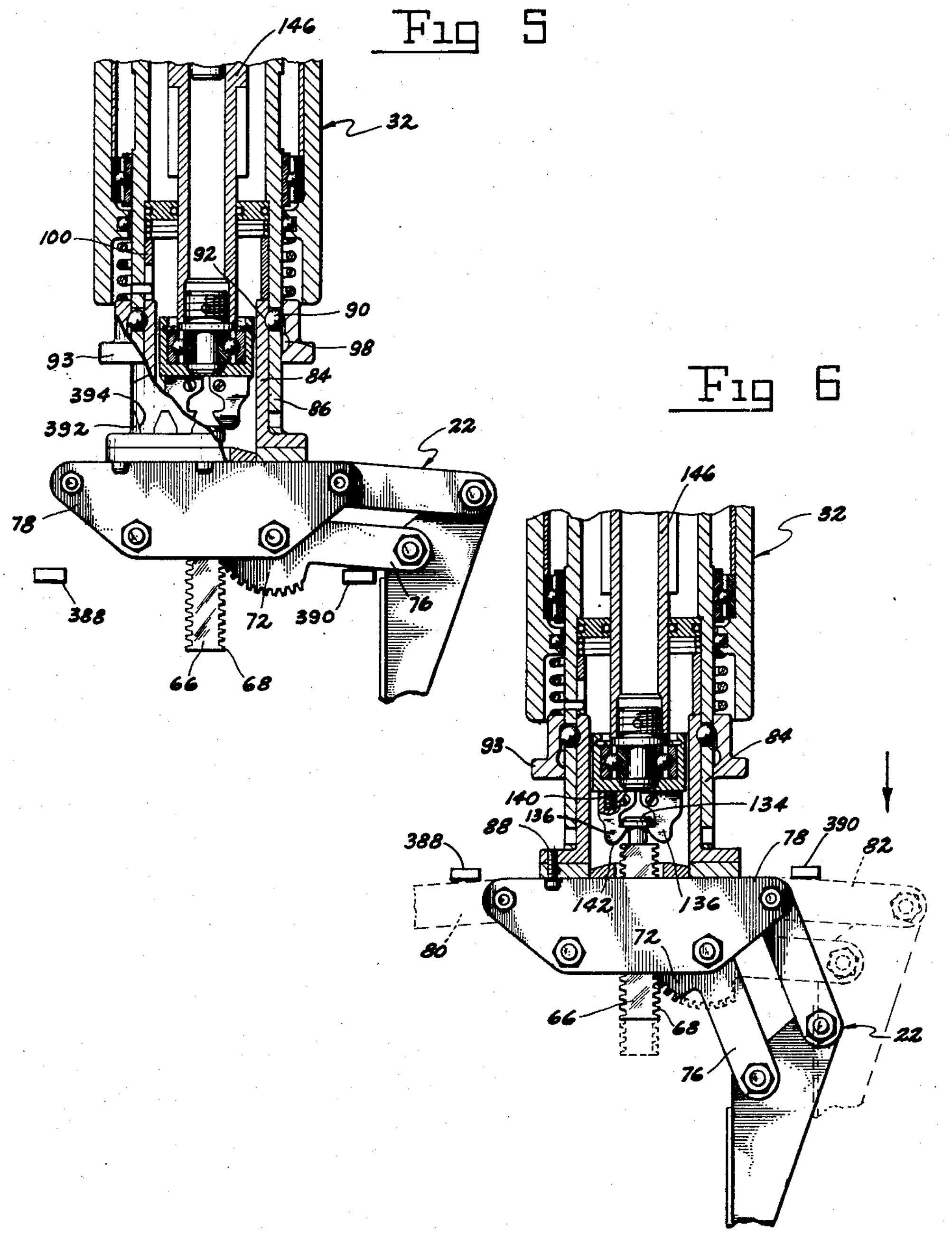
Fig. 5 is a view of the forearm portion of the handling unit taken partially in section and illustrating steps in attaching a different gripping device to the forearm.
Fig. 6 is a sectional view through the lower forearm illustrating the final step in attaching the different grip to the forearm.

Figures 3 and 4 illustrate the steps in removing the hand from the machine and Figures 5 and 6 illustrate the successive steps for replacing the hand with a new hand.

In Figs. 3–6 the steps of changing from one hand to another are shown. The grip driving member 146 is first run all the way out to open the grip to its widest point. This carries the tangs 136 against the cam face of the collar 144. As the tangs strike the collar their curved surfaces 142 force them apart against the action of the tang springs 140 spreading them away from the flanged end 134 of the reciprocating member 66. The fingers stay in this position as long as the grip driving member 146 remains driven outwardly.

The next step in the release of the hand is to push in the locking ring 93. This may be done by pushing the forearm down against the cantilever arms 380 and 382 which are part of the rack 384 which is provided for supporting the extra hands on the stand which carries the handling unit, Fig. 1.

Forcing the forearm against these cantilever arms pushes the retaining ring upwardly as shown in Fig. 4 thus permitting the balls 90 to move outwardly into the annular groove 98 of the locking ring. As soon as the balls move out of the depression 92, the hand supporting sleeve 84 is free to drop away from the forearm thus releasing the hand.

It will be noted that as the grip driving member 146 is, in the steps shown in Fig. 3, driven outwardly to release the tangs from the flange, tension is created by the compression of the disk springs 156. The moment the hand supporting sleeve is released the spring tension will be free to force the hand outwardly from the forearm to cause a positive release.

The moment the hand sleeve 84 begins to move outwardly it is followed by the ball-retaining sleeve 100 which is urged outwardly by the coil spring 102. The sleeve moves outwardly in front of the balls 90 to prevent them from dropping out of the pockets in the rotatable sleeve 86. The pin 104 prevents the ball retaining ring from moving too far outwardly.

To replace the hand which has just been removed, with a new substitute hand, the forearm is lifted upwardly and carried over to another hand which may be supported on another rack 386. This hand 22 is the double jaw type wherein the jaws move laterally of the axis of the hand and forearm and is described in Fig. 2. This hand is carried on a rack 386 being supported by a pair of projecting arms 388 and 390. The first step in attaching the hand is to move the forearm member 32 vertically downward to where the hand supporting sleeve 84 telescopes within the rotatable sleeve 86.

The hand carries at its base a member having driving teeth 392 which lock into mating recesses 394 on the rotatable sleeve 86. It will be noted that these teeth are tapered so that they will easily slip into the recesses and the rotatable sleeve 86 may be rotated while it is being lowered onto the hand for ease of sliding the teeth into the recesses.

As the hand supporting sleeve 84 telescopes into the rotatable sleeve 86, it will strike the ball retaining ring 100 carrying it inwardly of the forearm and the balls 90 will drop into the groove 92 in the hand supporting sleeve. The driving teeth 392 will of course move into the recesses 394. When the balls drop into this groove 92 they move out of the annular groove 98 of the locking ring 93 thus permitting it to snap downwardly and lock the balls in place. At this point the hand is securely locked to the forearm and the mechanism for operating the jaws must be connected.

To lock the reciprocating member 66 to the grip driving member 146 the reciprocating member is forced upwardly so that its flanged end 134 will be forced between the tangs 136. As this flanged end strikes the tapered surfaces 142 the tangs are forced apart and due to the action of their springs 140 they will snap together to grip the flanged end to thereby connect the reciprocating member 66 to the grip driving member 146. To force the member 66 upwardly the jaws are artificially forced together such as by lifting the forearm up to carry the jaw carrying arms 80 or 82 against a stationary member such as the arms 388 and 390 of the rack 386. Thus the grip has been completely attached and the hands have been interchanged by the action of the remote control alone, operating the mechanical handling unit. The hands shown may be rapidly and readily replaced by special hands such as those having a wrench or screw driver end or the like.

*The forearm operating mechanism*

Figure 10:
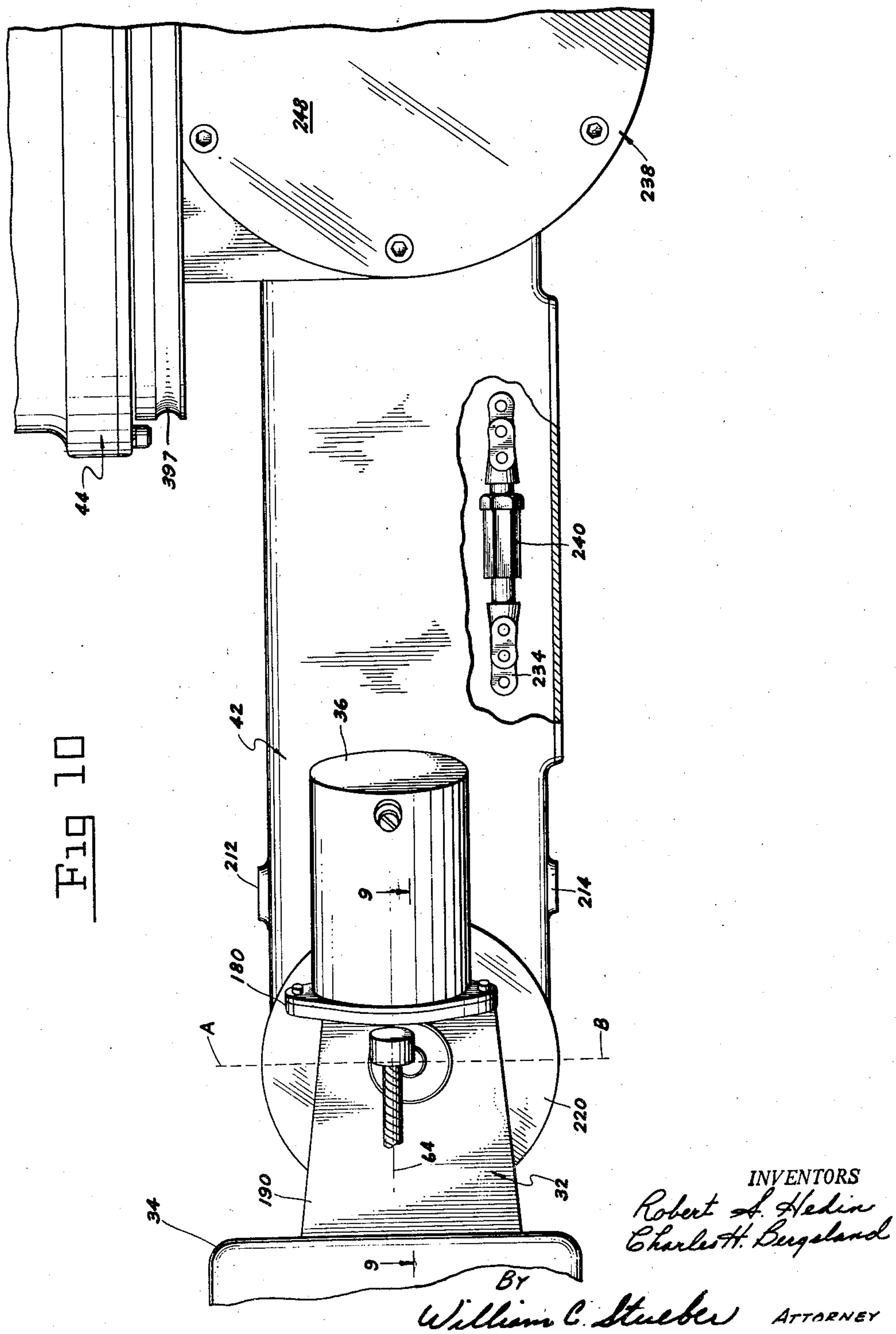
Fig. 10 is an elevational view of the upper arm of the material handling unit, the portion broken away to illustrate the drive for operating the forearm.

The forearm member 32 in Fig. 1 is pivoted about its axis 40 in either direction and may be pivoted through a full 180° with the longitudinal axis 64 of the forearm movable from position A of Fig. 10 to position B. The upper arm 42 carries small flattened projections 212 and 214 which are struck by the housing 34 of the forearm at the limits of forearm movement.

A portion of the mechanism for pivoting the forearm may be best seen in Fig. 9 which shows a section taken through the joint between the forearm and the upper arm. The forearm has a pair of projecting arms 190 and 194 which straddle the upper arm 42 and are pivotally connected thereto to rotate about axis 40. The forearm pivots on bearings 216 and 218 which are housed within the lower joint shown generally at 220 of the upper arm.

This joint has an opening on one side for purposes of installing the sprocket 222 and bearings found within the joint and a plate 224 covers the opening. The bearings 216 and 218 pivotally carry the hub 226 which extends through the arms 190 and 194 that support the forearm. Keyed to the hub and to these arms by means of keys 228 and 230 is a driving sprocket 232 having a double row of teeth. It will be seen from Fig. 9 that rotation of this sprocket 232 will pivot the forearm 32.

For rotating the sprocket a double chain 234 extends through the hollow upper arm 42 and passes over the sprocket 232. The chain is driven by a sprocket 236, Fig. 11, which also carries a double row of teeth and which is housed within the joint 238 between the upper arm and the shoulder 44.

The chain is tightened with a standard tightening device 240 so that the lower arm will immediately respond to rotations of the sprocket 236 in either direction. The joint 238 between the upper arm 42 and the shoulder 44 is comprised of two hollow projections 242 and 244, Fig. 11, which carry driving mechanism for pivoting both the forearm and upper arm. These hollow projections straddle the upper arm 42 which is pivotally suspended between them.

The projections are provided on each side with covering plates 246 and 248 which are bolted over the hollow projections to protect the gearing contained therein.

Figure 11:
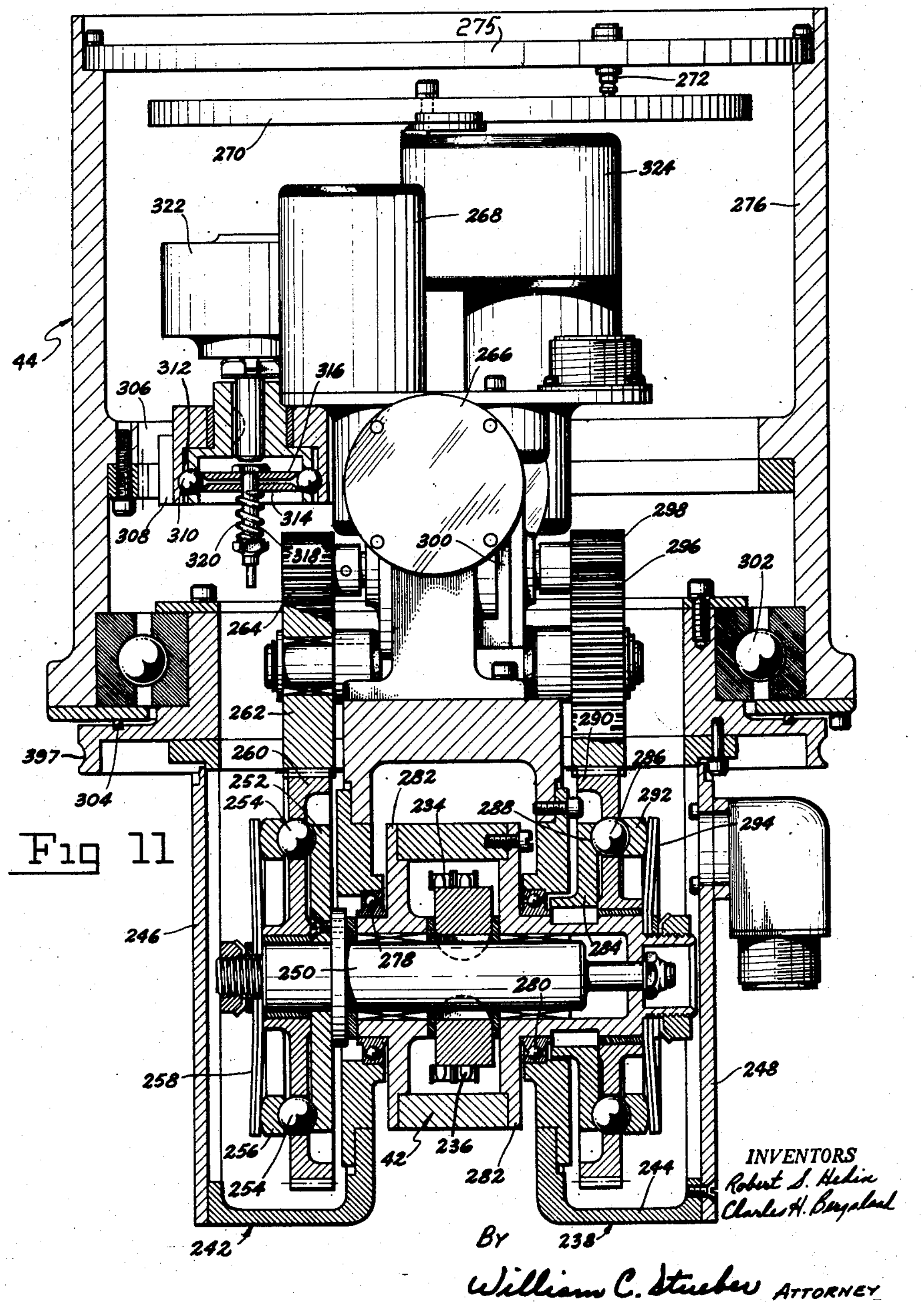
Fig. 11 is a sectional view taken along line 11—11 of Fig. 1.

The mechanism for pivoting the forearm can best be traced in Fig. 11. The sprocket 236 which drives the chain 234, leading to the sprocket on the forearm, is keyed to a shaft 250 which is driven from its left end in Fig. 11 by a disk 252 secured thereto.

This disk contains depressions into which project balls 254 to form part of the slip clutch. These balls are urged into the projections by a plate 256 biased toward the balls by springs 258 which are held on the end of the shaft 250. The balls are carried in pockets in a driving gear 260 which is driven by a gear 262. This gear is driven by another pinion 264 driven through worm gearing 266 which is operated by a motor 268. Thus through the gear chain just described the power is transmitted from the motor 268 to operate the forearm 32 which is pivoted about the point at which it is joined to the upper arm and this joint may be corresponded to the elbow joint of the human arm.

It will be seen that the major portion of the forearm driving mechanism is compactly carried in the shoulder 44 where it is housed and does not have to be raised or lowered with the upper arm or forearm and yet the drive from the motor is direct and positive.

Electrical current is supplied to the forearm drive motor 268 from the remote control panel through slip rings shown at 270 in Fig. 11. These slip rings are engaged by brushes 272 which are connected to leads 274 in Fig. 1 which pass down through the hollow column 276 of the shoulder member 44. With the slip ring arrangement power can be continuously supplied to the operating motors while the shoulder is rotating and rotation of the shoulder can be unlimited in either direction since the brushes 272 are mounted on the plate 275 which is part of the housing 276 of the shoulder which does not rotate. The driving motors for the forearm and upper arm within this housing, however, do rotate with the shoulder.

Electrical current is also supplied to motors 36 and 38 which operate the grip and hand, through these brushes and slip rings. Electrical leads, not shown, connect from the rings to the motors. Because the operation of the brushes and slip rings is believed apparent from the above description only one brush need be illustrated and it will be understood that there are a series of brushes engaging a series of slip rings 270 to individually supply current to their respective motors.

*The upper arm operating mechanism*

The upper arm operating mechanism is also housed in the shoulder housing 276 but operates independently of the mechanism for moving the forearm and of the mechanism for rotating the shoulder which is also contained within this same housing.

The upper joint of the upper arm 42 which is positioned between the hollow projections 242 and 238 in Fig. 11 is carried therebetween on bearings 278 and 280. These bearings are placed outside of the hub 282 of the end of the upper arm or so that it may be pivoted independently of the rotation of the shaft 250 which drives the forearm. Keyed to this hub 282 is a driving plate 284 which is rotated by balls 286 which drop in depressions 288 in the plate. These balls are carried in pockets in the gear 290 and the balls are urged into the depressions by a pressure plate 292 which is urged toward the balls by spring disks 294 carried on the end of the hub 282. This arrangement provides a slip clutch which will slip if excess resistance to pivot movement of the upper arm is encountered.

The upper arm driving gear 290 is rotated by a gear 296 driven by pinion 298. This pinion is driven through a gear train which begins at 300 and is driven by a motor, not shown, but which is enclosed within the housing 276 of the shoulder.

This motor is again driven by electricity supplied and controlled by the remote control panel through the brushes and slip rings for rotation of the motor to pivot the upper arm 42 through a full 180°.

*The shoulder operating mechanism*

The shoulder which supports the upper arm and lower arm and grip has rotational movement about its vertical axis and vertical movement in the direction of the same axis. The shoulder is in two parts, the inside which rotates and the housing 276 and vertical tube which do not rotate. The entire shoulder is also carried horizontally in the direction indicated by the arrows 50 of Fig. 1 along the tracks 54 and 56. It will be understood that horizontal motion in a direction at right angles to the arrows 50 could be obtained by furnishing a carriage having rails extending in the direction of movement as is shown in the copending application, Remote Control Handling Unit, James.

For obtaining rotational movement of the shoulder about a vertical axis the upper shoulder portion including the housing 276 remains stationary and the lower portions, including the operating mechanism within the housing, the hollow projections 242 and 244, are rotatable. This lower portion is supported on bearings indicated at 302 in Fig. 11. A dust seal 304 is placed between the housing 276 and the lower rotational part of the shoulder.

To drive the lower part of the shoulder in rotation, an annular ring gear 306 is mounted within the circular shell of the housing 276 and pinion 308 meshes with this ring gear to rotate the assembly which is supported on the bearings 302. The pinion drives through a slip clutch which includes balls 310 seated in depressions 312 on the inner surface of the pinion. The driving balls 310 are pressed outwardly into the depressions by a spring loaded plate 314 urged against a cooperative plate 316 by a pin 318 carrying a coiled spring 320. These plates have tapered shoulders to force the ball outwardly and when excessive resistance to rotation of the shoulder is encountered the balls 310 jump out of the recess 312 forcing the plates apart in a well known manner. The plates and balls are driven to rotate the shoulder by worm gear 322 which is driven through a worm, not shown, by a motor 324.

This shoulder rotation motor is also supplied with electricity from the remote control panel through the brushes and slip rings and the electricity is continuously supplied while the shoulder is rotating.

It will be understood that the shoulder as described may also be arranged to rotate about an axis other than vertical where the installation requires this construction because of space requirements or the location of the material on which the handling unit is to operate.

Figure 12:
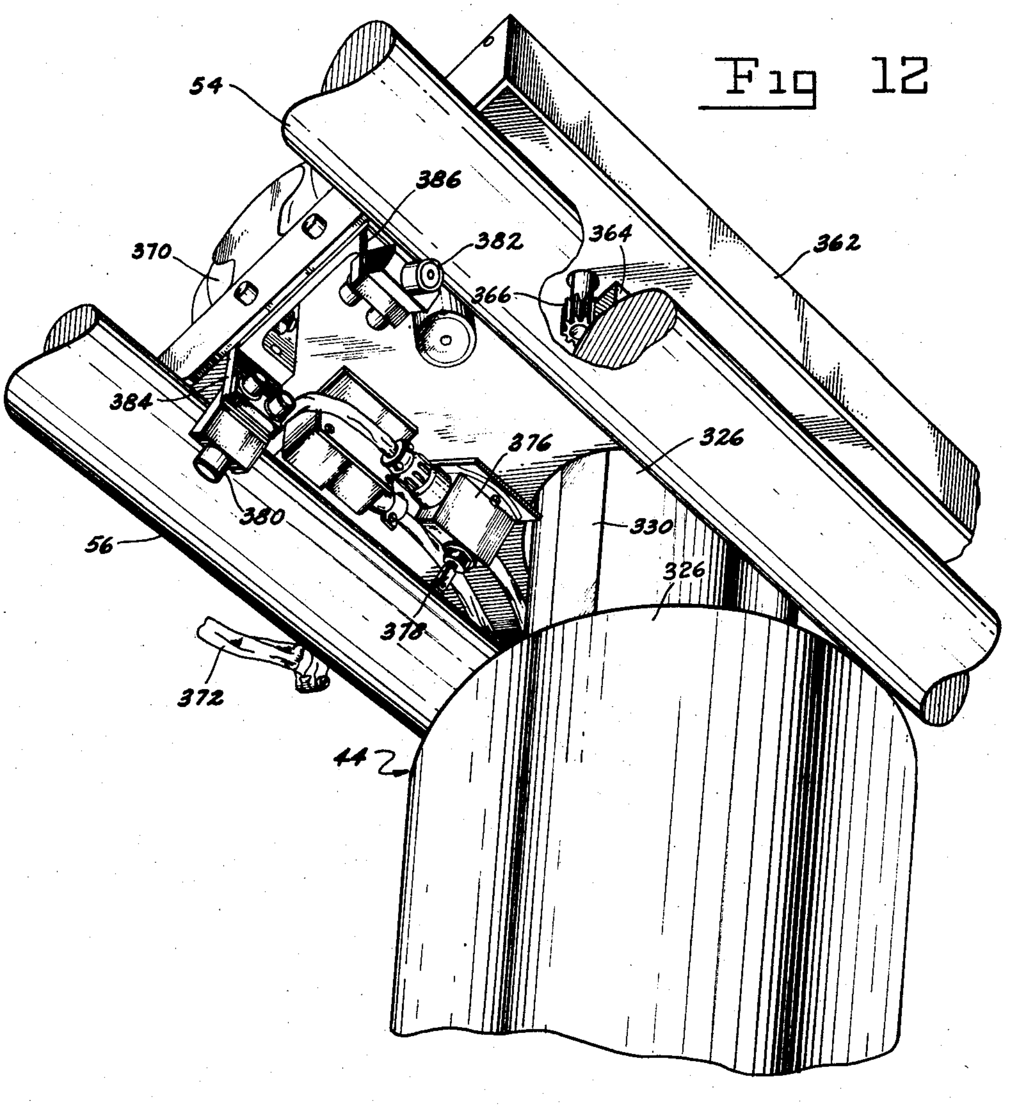
Fig. 12 is a perspective view taken from beneath the mechanism for carrying the shoulder portion horizontally along the supporting lines.

Vertical motion of the shoulder is obtained by the vertical tube 326 telescoping upwardly into the enclosing tube 328. The upper shoulder housing 276 is suspended directly below this shoulder tube 326 and thus the shoulder is supported therefrom. In Figs. 1 and 12, it will be seen that the shoulder tube is provided with flat vertical lands 330. Rollers 332 and 334 press against these flat lands to prevent the supporting tube 326 from rotating with respect to the hollow tube 328.

The supporting tube 326 is hollow inside as is shown in Fig. 1 to contain the coils of the electrical leads 274 which stretch out or compress as the shoulder is lowered or raised.

To raise the shoulder, a cable 336 extends downwardly within the interior of the tube 326 and is secured therein by a connector 338. The cable is either retracted or extended to raise or lower the shoulder and as it is extended the shoulder is lowered by gravity due to the weight of the suspended mechanism.

For purposes of operating the cable it passes over a pair of sheaves 340 and 342 which are mounted at the top of the enclosing tube 328. The end of the cable is wound on a winch 344 which is rotating through gearing 346 by a motor 348. This motor is supplied electricity from the control panel through leads 350 which pass through "up" and "down" limit switches 352 and 354. These normally closed limit switches are opened when the shoulder reaches the limit of its up or down travel and the switches are opened by being depressed by a plate 356 whose position is controlled by a traveling nut 358 mounted on a rotating screw 360 which rotates with the winch.

Travel of the shoulder in a horizontal direction is effected by the carriage 362 which moves horizontally on the rails 54 and 56. The rail 54 carries a rack 364 engaged by a pinion 366, Fig. 12. This pinion is rotated through worm gearing 368 driven by a motor 370. This motor is operated by electricity supplied through leads from the control panel and the entire electrical supply for all the operating motors is brought in through a cable 372 having one end connected to the moving carriage 362, Fig. 12.

Thus it will be seen that with operation of the motor 370 the pinion 366 will rotate to move the carriage along the rails 54 and 56.

To hold the pinion 366 in engagement with the rack 364 a displacement preventing roller not shown engages the rail 54 from the opposite side from the pinion 366. This roller is rotatably mounted on the lower face of the carriage 362, as is illustrated in Fig. 12, and prevents the pinion from jumping out of engagement with the rack with heavy loads.

Horizontal forces of an excessive nature which are applied to the hand or the arm suspended below the shoulder will cause the carriage to tip relative to the rails. To prevent damage from excessive deflections of this nature a safety switch 376 is provided which has a plunger 378 carrying a roller to roll on the track 56. When the carriage tips the roller, which is spring held in engagement with the track, it will permit the plunger to move outwardly to open the normally closed safety switch 376 and this will terminate the electrical supply to stop further operation of the handling unit.

Another way of mounting the safety switch 376 would be with the plunger 378 bearing against the spring beams 384 or 386 which will be described in the succeeding paragraph. Bending of these springs with overload would then open the safety switch and stop the motor preventing damage to the mechanism.

Means are provided to hold the carriage stable with respect to the track with normal loads. To this end a pair of rollers 380 and 382 bear against the inner under surfaces of the tracks 56 and 54 respectively. These rollers are carried on spring beams 384 and 386 which project downwardly from the carriage. These springs permit excessive loads to tilt the carriage to thus operate the safety switch 376.

In some instances the handling unit may be called upon to operate in conditions and atmospheres which would penetrate the working parts and corrode them. To protect the parts a shielding jacket 398 may be supplied to cover the operating parts. This jacket 398, shown in Fig. 1, is secured at one end to the unit by a band 399 which draws the jacket into a groove 397. This groove may be seen in detail in Figs. 10 or 11. The lower end of the jacket is secured to the arm by being drawn into a groove by a band 396.

As will be observed in Fig. 1, the protective jacket covers the forearm, the upper arm, and the joints connecting these members as well as the shoulder joint where the upper arm is connected to the shoulder. The reciprocating and rotational motors for operating the hand and the grip are also positively protected.

When the hand has finished operating in the objectionable atmosphere it may be readily cleaned of the contaminated material by being washed down with a hose and the water will not contact the operating joints. The protective jacket may be of any suitable material which is non-porous, light weight and flexible and polyethylene is an example of a material with such desirable properties.

The present invention provides a remotely controlled material handling unit which meets the objectives herein set forth and which is capable of intricate movements and delicate control. The construction of the mechanism is such that it may be adapted to large units which can handle very heavy loads without sacrificing the delicate control which enables small controlled movements of the load carried by the handling unit.

The mechanism is streamlined and compact in construction with the mechanism for performing the complex operations of the hand and grip being enclosed within a compact single housing. The mechanism is contained as a unit and yet is flexible so that it can operate various types of grips. This feature combined with the ability of the apparatus to interchange grips by its own action and without the necessity of manual aid other than operation from the control panel is an outstanding advantage.

We have, in the drawings and specification, presented a detailed disclosure of the preferred embodiments of our invention. It is to be understood that the invention is susceptible of modifications, structural changes and various applications of use within the spirit and scope of the invention and we do not intend to limit the invention to the specific form disclosed but intend to cover all modifications, changes and alternative constructions and methods falling within the scope of the principles taught by our invention.

What is claimed:

1. A remotely controlled handling unit comprising a hand member having a pair of gripping jaws, a reciprocable member positively connected to at least one of the jaws to move the jaws together or apart, a forearm member adapted to support the hand, power hand operating means carried on the forearm for operating the hand including a first power means for giving reciprocation to said reciprocable member, second power means imparting rotation to the hand, and a connector joint releasably joining the first power means to the reciprocable member, said connector positively transmitting linear motion in both directions between the power means and reciprocable member and being capable of free rotation so that the hand may rotate without reciprocating the reciprocable member or affecting the position of the gripping jaws relative to each other, said connector joint being adapted by reason of its releasability to disconnect the reciprocable member from the power means for removing the hand from the forearm.

2. A remotely controlled handling unit comprising a hand member having a pair of gripping jaws, a reciprocable member positively connected to at least one of the jaws to move them together and apart, a forearm member for supporting the hand in operation, reciprocating power means on the forearm to move the jaws together and apart, a first connector joining the reciprocating power means and the reciprocable member, said connector positively transmitting linear motion in both directions from the power means to the reciprocable member but permitting free rotation of the hand with respect to the power means, rotating power means on the forearm to rotate the jaws, and a second connector joining the rotating power means and the hand, said first connector being disconnectable from said reciprocable member and said second connector being disconnectable from said rotating power means to remove the hand from the forearm.

3. A remotely controlled handling unit comprising a hand member having a pair of gripping jaws, a reciprocable member associated with at least one of the jaws to move them together and apart and having a connecting flange at one end, a forearm member for supporting the hand, reciprocating power means on the forearm for operating the hand and closing and opening the jaws, a connector to join the power means and reciprocable member, one of the elements of the connector being a hook means which extends over the said connecting flange to move it in reciprocation and the other element being a rotational bearing to permit relative rotation of the power means and reciprocable member with respect to each other to permit free rotation of the hand, and rotating power means operatively connected to the hand to rotate it.

4. A remotely controlled handling unit comprising a hand member having a pair of gripping jaws, a reciprocable member operatively associated with at least one of the jaws to move them together and apart, a forearm member for supporting the hand, reciprocating power means on the forearm for operating the hand being operatively connected to said reciprocable member, rotating power means on the forearm for rotating the hand, connecting means for joining the hand to the rotating power means, said connecting means including a depression in one member with a movable projection on the other member and means to hold the projection in the depression to lock the rotating power means to the hand.

5. A remotely controlled handling unit comprising a hand member having a pair of gripping jaws, a centrally located reciprocable member operatively associated with at least one of the jaws to move them together for gripping an article, a forearm member for supporting the hand member, reciprocating power means on the forearm for operating the hand being operatively connected to the reciprocable member, rotating power means on the forearm for operating the hand and having a rotatable sleeve extending over the reciprocable member, a second mating sleeve positioned in telescoping relationship with the first sleeve and secured to the hand, and connecting means for joining the first sleeve to the second and being disconnectable for removal of the hand.

6. A remotely controlled handling unit comprising a hand member having a pair of gripping jaws, a centrally located reciprocable member operatively associated with at least one of the jaws to move them together and apart, a forearm member for carrying the hand, reciprocating power means on the forearm for operating the hand and being operatively connected to the reciprocable member, rotating power means on the forearm for operating the hand, a first sleeve rotatable with said rotating power means and extending over the reciprocable member carrying locking balls, a second mating sleeve fitting within the first and provided with locking depressions to receive said balls, a ring fitted on the first sleeve to lock the balls in the depressions in locking position, said ring slideable on the sleeve to release the balls for sliding the second sleeve out of the first to remove the hand from the forearm, and means to hold said ring in locking position.

7. A remotely controlled handling unit comprising a hand member having a pair of gripping jaws, a reciprocating member operatively associated with the jaws to move them together and apart, a forearm member for supporting the hand rotating power means operatively connected to the hand for imparting a rotation thereto, reciprocating power means for operating the reciprocable member to move the jaws, a connector for joining the reciprocating power means and reciprocable member and being disconnectable for removing the hand, and cam means operatively associated with the connector and located at the end of the path of travel of the reciprocable member to be engaged by the connector, said cam means camming the connector member to disconnect position to release the hand from the reciprocating power means.

8. A remotely controlled handling unit comprising a hand member having a pair of gripping jaws, a reciprocating member operatively connected to at least one of the jaws to move the jaws to gripping and release positions, a forearm member for supporting the hand, rotating power means on the forearm operatively connected to the hand for rotating the hand, reciprocating power means on the forearm to be connected to the reciprocating member for operating the jaws, a connector for joining the reciprocating member and the reciprocating power means including a flanged member and a hook extending over the edge of the flange to positively connect to the flange member, biasing means urging the hook toward locking position over the edge of the flange, said hook having an inclined cam-engaging surface for unlocking the hook, and a cam surface positioned at the end of the path of travel of said connector to be engaged by the hook, the hook being cammed outwardly by the cam to release the flange for removal of the hand from the forearm.

9. A remotely controlled handling unit comprising a hand member having a pair of gripping jaws arranged for movement toward and away from each other to grip and release an object, a forearm member for supporting the hand and having a central axis about which the hand rotates, a reciprocating member operatively associated with the jaws and reciprocable in a path parallel to said forearm axis to operate the jaws, reciprocating power means on the forearm to operate the jaws, a connector between the reciprocating member and the reciprocating power means including a flange and a mating hook to extend over the edge of the flange for connecting the two members, said hook and flange being freely rotatable relative to said reciprocating power means, means to move the hook to disconnecting position, a rotating power means on the forearm for rotating the hand, a second connecting means for joining the rotating power means to the hand including a locking member and a receiving opening for receiving said locking member, and means to hold the locking member in locking position and being movable with respect to the locking member to release the locking member and disconnect the rotating power means from the hand for removal of the hand from the forearm.

10. A remotely controlled handling unit comprising a hand member having a pair of gripping jaws, a forearm member for supporting the hand, rotating power means including a drive motor for rotating the hand with respect to the forearm, reciprocating power means including a drive motor for operating the gripping jaws, an upper arm for supporting the forearm, an elbow joint to join the upper arm and the forearm, said elbow joint rotatably joining the forearm to rotate about a horizontal axis and permit rotation from horizontal position at one side of the upper arm to a horizontal position at the other side of the upper arm, and power means on the upper arm for rotating the forearm with respect to the upper arm, said rotating and reciprocating power means and drive motors mounted on the forearm member to rotate with the forearm and be unaffected by rotation thereof about said elbow joint.

11. A remotely controlled handling unit comprising a hand member having a pair of gripping jaws, a forearm member supporting the hand member, reciprocating power means including a motor mounted on the forearm for operating the gripping jaws, rotating power means including a motor mounted on the forearm for rotating the hand with respect to the forearm, an upper arm member for supporting the forearm, an elbow joint for joining the forearm to the upper arm including a first horizontal axis about which the forearm pivots, said elbow joint permitting pivotal movement from a horizontal position at one side of the upper arm to a horizontal position on the opposing side of the upper arm, a shoulder member supporting the upper arm for rotation about a second horizontal axis, sprocket means coaxial with said first axis and connected to the forearm, second sprocket means coaxial with said second axis and carrying a chain connecting said sprockets, and power means mounted on the shoulder and operably connected to said second sprocket to pivot the forearm between said horizontal positions.

12. A remotely controlled handling unit comprising a hand member having a pair of gripping jaws, a forearm for supporting the gripping jaws, reciprocating electrical power means on the forearm for operating the gripping jaws, rotational electrical power means on the forearm operatively connected to the hand, an upper arm member for supporting the forearm, a shoulder member including a non-rotational section on a rotational section for supporting the forearm, electrical leads supplying current to the rotational and reciprocating power means including slip rings on one of said shoulder sections and brushes on the other shoulder section, said slip rings and brushes furnishing a continual supply of electricity to the power means with unlimited rotation of the rotational shoulder section, and a support for rotationally supporting the shoulder member.

13. A remotely controlled handling unit comprising a hand member having a pair of gripping jaws, a forearm member supporting the hand member, an upper arm member supporting the forearm member, a pivotal support joining the forearm to the upper arm and including a horizontal axis about which the forearm pivots, a reciprocating power means for operating the gripping jaws including an electric motor located diametrically opposite the forearm member with respect to said horizontal axis, and a rotating power means rotating the hand with respect to the forearm including an electric motor mounted on the forearm and positioned diametrically opposite the forearm with respect to said axis, said motors thereby counterbalancing the weight of the forearm and hand on said axis.

14. A remotely controlled handling unit comprising a hand member having a pair of gripping jaws, a forearm member for supporting the hand reciprocating power means on the forearm for operating the jaws of the hand, rotational power means on the forearm for rotating the hand with respect to the forearm, an upper arm member for pivotally supporting the forearm for rotational movement about a horizontal axis, power means to give pivotal movement to said forearm, a shoulder member for supporting the upper arm, a pair of horizontal tracks for supporting the shoulder member, rollers between the shoulder member and tracks to permit the shoulder member to roll on the tracks to change its horizontal position, vertical spring beams secured to the shoulder member and carrying rollers at their ends which bear against the inner side surfaces of the tracks, power means for moving the shoulder member along the horizontal tracks, electrical supply means for operating the power means, a switch for controlling the power means mounted on the shoulder member and having a switch controlling member responsive to changes in the position of the shoulder normal to the surface of the tracks, excessive deflection of the spring beams operating said switch member to terminate the electrical supply to the power means and to stop movement of the shoulder in the event of excessive horizontal deflection of the shoulder normal to the tracks.

15. A remotely controlled handling unit comprising a hand member having a pair of gripping jaws, a forearm member for supporting the hand, a reciprocating member operatively associated with the jaws to move them together or apart, reciprocating power means for operating the reciprocating member to move the jaws, a connector to join the reciprocating member to the power means, rotational power means for rotating the hand with respect to the forearm, driving means between the rotational power means and the hand including a clutch which permits relative movement between the hand and the rotational power means when the resistance to movement of the hand reaches a predetermined limit, said clutch preventing damage to the power means and hand when overloads are encountered.

16. A remotely controlled handling unit comprising a hand member having a pair of gripping jaws, a reciprocating member operatively associated with the jaws to move them together to gripping position and apart to release position with reciprocation, a forearm for supporting the hand, reciprocating power means operatively connected to the reciprocating member to operate the jaws, rotational power means on the forearm operatively connected to the hand to rotate it with respect to the forearm, an upper arm member for supporting the forearm, a pivotal connection between the upper arm and forearm supporting the forearm for rotation about a horizontal axis, power means for pivoting the forearm with respect to the upper arm, driving means connecting the power means to the forearm and including a driven member connected to the forearm and a driving member connected to the power means, a clutch between said driven and driving members permitting relative movement therebetween when the resistance torque on the forearm exceeds a predetermined amount.

17. A remotely controlled handling unit comprising a hand member having a pair of gripping jaws, a reciprocating member associated with the jaws to operate them between gripping and release positions, a forearm for supporting the hand, a reciprocating power means on the forearm operatively attached to the reciprocating member to move the jaws, connecting means between the reciprocating member and reciprocating power means including a clutch which is adjusted to permit relative movement between said members when the resistance to the movement of the gripping jaws exceeds a predetermined force, and means to rotate the hand on said forearm.

18. A remotely controlled handling unit comprising a hand member having a pair of gripping jaws, a reciprocating member operatively associated with the jaws to move them to gripping and release position, a forearm member for supporting the hand, said forearm member including a hollow closed housing, reciprocating power means mounted on the forearm and operatively connected to said reciprocating member to operate the jaws, driving means between the reciprocating power means and the reciprocating member enclosed in said housing, rotational power means mounted on the forearm operatively connected to the hand to rotate it with respect to the forearm, driving means between said rotational power means and the hand and enclosed within said housing.

19. A remotely controlled handling unit comprising a hand member having a pair of gripping jaws, a jaw operating member associated with said gripping jaws to impart movement thereto for moving them to gripping and release position, a forearm for supporting the hand including an enclosing housing, reciprocating power means mounted on the forearm for operating the gripping jaws, driving means between the reciprocating power means and the jaw operating member including a screw member rotated by the power means and a nut traversing the screw member to be reciprocated thereby, said nut connected to the jaw operating member, the nut and screw member enclosed within said housing, rotational power means mounted on the forearm, a driving member between the rotational power means and the hand and operatively connected to the hand, said driving member rotated within said housing about an axis coaxial with the axis of said screw member.

20. A remotely controlled handling unit comprising a hand member having a pair of gripping jaws, a jaw operating member operatively associated with the jaws to cause them to close and open, a forearm member for supporting the hand including a housing, a jaw operating power means mounted on the forearm for operating the jaws, a driving means located within said housing and connecting the jaw operating member to the jaw operating power means, said jaw driving means extending axially within the forearm, rotational power operation means for rotating the hand member, and driving means for connecting the jaws to the rotational power operating means including a hollow sleeve secured to the hand member and extending coaxially with said jaw driving means.

21. A remotely controlled handling unit comprising a hand member having a pair of gripping jaws, a forearm member for supporting the hand, a reciprocating jaw operating member positively connected with the jaws to cause them to close and open and having reciprocation along a central axis, said operating member having an enlarged portion, a hand rotating member operatively connected to the hand and rotatable about said central axis to rotate the hand, reciprocating power means for driving said jaw operating member, means carried by said reciprocating means for releasably engaging opposite sides of said enlarged portion, and rotational power means for driving said hand rotating member, said hand rotating member and rotational power means operable independently of said jaw operating member, said releasably engaging means and reciprocating power means and being free of mechanical operating connections therewith.

22. A remotely controlled handling unit comprising a hand member having a pair of gripping jaws, a forearm for supporting the hand member including a housing, power means located on the forearm within said housing and operatively connected to the gripping jaws, rotational power means mounted on the forearm within said housing and operatively connected to the hand to rotate the hand and gripping jaws, an upper arm pivotally supporting the forearm for rotation about a horizontal axis, a shoulder member for pivotally supporting the upper arm for movement about a horizontal axis, and an enclosing plastic jacket tightly secured to the shoulder and to the forearm housing to enclose the rotational and reciprocating hand and jaw operating means and the pivotal connections between the forearm and the upper arm and upper arm and shoulder to permit contact between the handling unit and gas or fluids without damaging the operating members and yet permitting free rotation of the hand and free operation of the gripping jaws.

23. A remotely controlled handling unit comprising a hand member having a pair of gripping jaws and a jaw supporting base on which the jaws are pivoted, a forearm member for supporting the hand member, reciprocating power means mounted on the forearm member to operate the jaws, rotating power means mounted on the forearm member to rotate the hand, a connector for disconnectably securing the reciprocating power means to the hand, a second connector for disconnectably securing the rotating power means to the hand, and a rotational locking means to insure rotation of the hand with the rotational driving means including driving teeth and mating recesses for receiving the teeth when the hand is connected to the forearm.

24. A remotely controlled handling unit comprising a hand member having gripping jaws, a forearm member for supporting the hand member, an upper arm for supporting the forearm, reciprocating power means mounted on the forearm for operating the jaws, rotational power means mounted on the forearm for rotating the hand, a connector for joining the rotational power means to the hand including a rotatable first sleeve and a telescoping mating second sleeve positioned within the rotatable sleeve, depressions in the second sleeve and free locking members carried in pockets in the first sleeve, and means to lock the locking members in the depressions to create a positive drive between said sleeves, and a ring positioned within the second sleeve and movable over said sleeve to hold the locking members in the pockets in said second sleeve when the first sleeve is removed therefrom upon removing the hand from the forearm.

25. A remotely controlled handling unit in accordance with claim 24 in which said ring is biased outwardly by a spring against the second sleeve to urge the second sleeve out of the first sleeve.

26. A remotely controlled handling unit comprising a hand member having a pair of gripping jaws, a forearm member for supporting the hand member, an upper arm for supporting the forearm, reciprocating power means for operating the jaws mounted on the forearm, spring means biasing the hand outwardly when the jaws have been moved to their extreme position before removal of the hand from the forearm, said spring means aiding the removal of the hand from the forearm, rotational power means mounted on the forearm for rotating the hand and including a rotational first sleeve, a second mating sleeve supporting the hand and telescoping with the first sleeve, and connecting means joining the two sleeves, said connecting means being disconnectable and said spring means urging the sleeve members apart when disconnected.

27. A remotely controlled handling unit comprising a hand member having a pair of gripping jaws, a forearm for supporting the hand member thereon, powered operating means mounted on the forearm for operating the hand and gripping jaws, an upper arm for supporting the forearm, a shoulder member supporting the upper arm and capable of vertical movement, said shoulder including a hollow vertical first tube, a second tube surrounding the shoulder tube providing a guiding bearing surface, means for raising the shoulder member and first tube including a cable member extending down into the hollow tube and secured therein, and electrical supply wiring coiled within said hollow shoulder tube and leading to the powered operating means.

28. A remotely controlled handling unit comprising a hand member having gripping jaws, a forearm member for supporting the hand member, power means on the forearm for operating the hand and jaws, an upper arm for supporting the forearm, a shoulder for supporting the upper arm including a rotatable and a non-rotatable portion which includes a vertical hollow first tube, a support for the shoulder including a tube for surrounding said first tube, means connected to the first tube for lifting and lowering the shoulder, current supply means leading down into the hollow shoulder tube, slip rings connected to the rotatable portion of the shoulder, brushes connected to the non-rotatable portion of the shoulder and engaging the slip rings and connected to the power supply means, and leads connecting from the slip rings to said power means for operating the hand.

References Cited in the file of this patent

UNITED STATES PATENTS

| | | |
|---|---|---|
| 2,415,997 | Eldred | Feb. 18, 1947 |
| 2,476,249 | Payne | July 12, 1949 |
| 2,580,987 | Alderson | Jan. 1, 1952 |
| 2,677,342 | Miller | May 4, 1954 |
| 2,679,940 | Goertz et al. | June 1, 1954 |

FOREIGN PATENTS

| | | |
|---|---|---|
| 174,407 | Austria | Mar. 25, 1953 |